United States Patent Office 2,968,660
Patented Jan. 17, 1961

2,968,660

EPOXY PATCHOULANES AND METHOD FOR PREPARING PATCHOULIONE THEREWITH

George Hermann Buchi, Cambridge, Mass., Robert E. Erickson, Metuchen, N.J., Nobel Wakabayashi, Berkeley, Calif., and Habib-Emile Eschinazi, Montclair, N.J., assignors to The Givaudan Corporation, New York, N.Y., a corporation of New Jersey No Drawing. Filed Apr. 14, 1958, Ser. No. 728,081

4 Claims. (Cl. 260—348)

This invention relates to novel chemical compounds, and more especially to epoxy patchoulanes, and to a novel method for preparing patchoulione therewith.

The novel substances of this invention may be represented in terms of their structural formulae as follows:

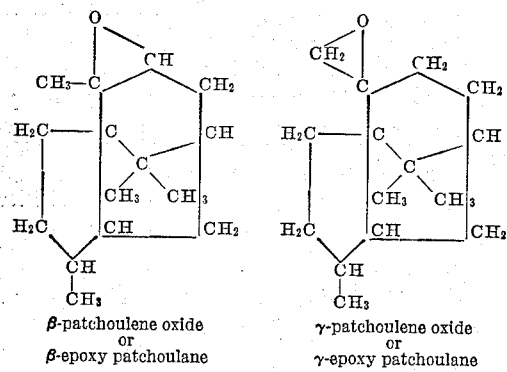

β-patchoulene oxide
or
β-epoxy patchoulane

γ-patchoulene oxide
or
γ-epoxy patchoulane

In general, the novel epoxy compounds of this invention are prepared by subjecting at least one member selected from the group consisting of β-patchoulene and γ-patchoulene to an agent capable of forming oxides with compounds having carbon-to-carbon unsaturation. Examples of such agents include peracetic acid, perbenzoic acid, chromic acid, vanadium pentoxide, alkali metal chromates, performic acid and perphthalic acid.

We have found that patchoulione, a compound having desirable olfactory properties, may be prepared from our novel epoxy compounds. This conversion may be brought about by rearrangement of the novel epoxy compounds with boron trifluoride, magnesium bromide, alumina, silica gel, aluminum chloride, and Lewis acids in general.

Patchoulione may be represented by the following chemical structure:

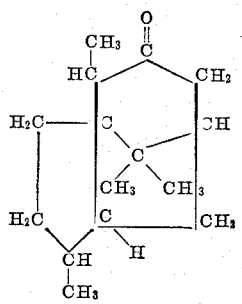

It is a novel ketone having a melting point of 47°–47.5° C. and has a powerful and striking ambergris note. This olfactory characteristic was unexpected in view of the structure of patchoulione and its patchouly alcohol origin. In appearance, patchoulione is a white, waxy crystalline solid. Its empirical formula is $C_{15}H_{24}O$; its 2,4-dinitrophenylhydrazone, $C_{21}H_{28}N_4O_4$, melts at 187.5°–188.5° C. and on equilibration in $D_2O$ patchoulione is converted to a trideuteroketone.

The following examples illustrate this invention without however limiting it thereto. All temperatures are in degrees centigrade.

EXAMPLE I

Patchouly alcohol—Commercial Oil of Patchouli was obtained from Fritzsche Bros., Inc., New York, and distilled at 15–17 mm. through a short Vigreux column. The fraction (approximately 50–60% of the original oil) boiling at 160°–170° solidified on cooling and was recrystallized from n-pentane at −70° to yield pure patchouly alcohol, M.P. 55°–56°, pure or mixed with a sample of patchouly alcohol prepared in the laboratories of L. Ruzicka, Zurich, Switzerland. The infrared spectrum is identical with that of the authentic sample.

*Analysis.*—Calcd. for $C_{15}H_{26}O$: C, 81.02; H, 11.79. Found: C, 80.99; H, 11.65.

The compound gave no color reaction with tetranitromethane.

Patchouly acetate—Ketene was prepared by the pyrolysis of acetone in an apparatus described by Hanford and Sauer in Organic Reactions, vol. III, 132 (1946).

Patchouly alcohol (30.0 g., 0.135 mole) was added to a solution of 1 ml. concentrated sulfuric acid in 300 ml. anhydrous ether (cooled to −5° under a calcium chloride drying tube) and allowed to react with ketene (approximately 0.22 mole) by bubbling in the reagent directly from the generator for 45 minutes. At the end of the reaction time the ether solution was poured into cold water. The ether layer was separated and washed with water, 5% sodium carbonate solution, water, and dried over anhydrous magnesium sulfate. Removal of the ether yielded 33.7 g. of a colorless oil.

The crude product was distilled through a semimicro column at 17 mm. and separation of material boiling up to 140° afforded a pale yellow oil (8.09 g., 26%) which was separated by redistillation, a rearranged isomer of patchoulene, B.P. 66.5°–67.5° (0.4 mm.), and β-, γ-patchoulene, B.P. 74°–75° (0.4 mm.), identified by their infrared spectra.

The pressure and the temperature in the column were then reduced and a second fraction (19.82 g., 56%) obtained, B.P. 102°–103° (0.2 mm.). Careful fractionation of a portion of the product by redistillation through the same column gave patchouly acetate, B.P. 101°–101.5° (0.2 mm.), $[n]^{25}D$ 1.5010, $d^{20}4$ 1.043, $[α]^{30}D$ 70.99°.

The melting point was determined to be approximately 24°. The compound did not give any color reaction with tetranitromethane.

*Analysis.*—Calcd. for $C_{17}H_{28}O_2$: C, 77.22; H, 10.67. Found: C, 77.05; H, 10.64.

Infrared spectrum (pure liquid): 3.4–3.52, 5.83, 6.85, 7.35 (broad), 7.65, 7.80 (sh), 8.0–8.2 (broad), 8.43, 8.62, 9.05, 9.7–10 (broad), 10.4, 10.7, 10.95, 11.4, 11.7, 12.2, 12.8, 13.4, 13.8, 14.5 microns.

In subsequent runs the following modifications were employed. Ketene was bubbled into 200 ml. anhydrous ether (protected by a calcium chloride drying tube) at −70° for 1 hour. A solution of patchouly alcohol (30.0 g., 0.135 mole) in 50 ml. dry ether was added followed by a solution of 1 ml. concentrated sulfuric acid in 50 ml. dry ether. Ketene was bubbled through for an additional 30 minutes and the reaction was worked up as above. Yields of 60–65% of patchouly acetate were obtained in this manner.

β-,γ-Patchoulene

A. Pyrolysis of patchouly acetate: Patchouly acetate (8.0 g., 0.03 mole), in a 25 ml. one-neck round-bottom flask with a 20 cm. Vigreux column leading to an ice-cooled receiver, was heated in a Wood's metal bath at 250°. Acetic acid was evolved slowly and collected in the receiver. The temperature was raised slowly to just maintain the evolution of acetic acid and keep the temperature of the vapors at the top of the Vigreux column below 120°. At a bath temperature of 320°, the product began to reflux and was maintained at this temperature for 30 minutes. The weight of the acetic acid was 1.3 g. (72%). After cooling to 27°, the product and distillate were combined and dissolved in ether. The ether solution was washed with water, dilute potassium hydroxide solution, water, and dried over anhydrous magnesium sulfate. Removal of the ether yielded 6.3 g. yellow oil which on distillation through a semimicro column at 17 mm. afforded one major fraction and about 1 g. of a non-distillable residue. Redistillation of the major fraction through the same column afforded β-,γ-patchoulene, B.P. 141°–142° (17 mm.), $[n]^{25}D$ 1.5075, $d^{20}_4$ 0.9537, $[\alpha]^{30}D$ −43.7°. The compound gave a yellow color with tetranitromethane.

*Analysis.*—Calcd. for $C_{15}H_{24}$: C, 88.16; H, 11.84. Found: C, 88.34; H, 11.82.

In another preparation, 5.0 g. of patchouly acetate yielded 3.62 g. (90%) of β-,γ-patchoulene, $[n]^{25}D$ 1.5073, after distillation through a semi-micro column.

B. Dehydration of patchouly alcohol: A mixture of patchouly alcohol (20.0 g., 0.09 mole), acetic anhydride (104 ml., 1.1 mole) and pyridine (30 ml.) was heated under reflux (protected by a drying tube) for 22 hours. The reaction mixture, after cooling to ice temperature, was slowly poured into a mixture of 100 g. sodium carbonate and 200 ml. of water. The reaction was cooled in an ice bath as necessary to moderate the evolution of carbon dioxide. After the hydrolysis of the excess acetic anhydride was essentially complete (ca. 1 hour), the organic material was extracted with two portions of ether, and the combined ether extracts were washed with water and dried over anhydrous magnesium sulfate. Removal of the ether and distillation of the residue through a 60 cm. modified Podbelniak column (J. Cason and H. Rapoport, "Laboratory Text in Organic Chemistry," Prentice-Hall, Inc., New York, New York, 1950, p. 237) gave 12.76 g. (70%) colorless oil, B.P. 129°–135° (17 mm. major portion at 134°–135°), infrared spectrum identical with that of β-,γ-patchoulene. A trace of pyridine was removed by filtering a petroleum ether solution of the hydrocarbon through 20 g. of alumina.

C. Twenty-four (24) g. of patchouly alcohol dissolved in 400 ml. of pyridine was placed in a 1000 ml. round-bottom flask. To this solution 140 ml. of $POCl_3$ was added at once and the flask equipped with a reflux condenser protected with a drying tube. The reaction mixture was refluxed for 6 hours and then cooled to room temperature. By this time, the reaction mixture had turned to a dark purple color.

Crushed ice was placed in a 10 cm. glass column and the cooled reaction mixture was poured slowly through the column with more ice added as needed to prevent overheating.

The mixture was extracted twice with ether and the ether layer was washed with 10% HCl twice and then with water until neutral. The ether was dried over sodium carbonate overnight, filtered, and the ether removed on a steam bath. Distillation of the product through a Vigreux column gave 21.8 g. of β-,γ-patchoulene (91% yield), colorless liquid, B.P. 53.5°–54.5°/0.14 mm., 141°–142°/17 mm., $[\alpha]^{25}D$ = −43.7°.

*Analysis.*—Calcd. for $C_{15}H_{24}$: C, 88.16; H, 11.84. Found: C, 88.34; H, 11.82.

*Thionyl chloride dehydration*

D. 4.5 m. of $SOCl_2$ and 25 ml. of pyridine were mixed in an Erlenmeyer flask and cooled in an ice-salt bath (−10 to −15° C.). 3.0 g. of patchouli alcohol in 20 ml. of pyridine was cooled the same way and then added to the $SOCl_2$ solution. The reaction mixture was kept in the ice-salt bath for 30 min. and then poured over a mixture of ice and $Na_2CO_3$. The solution was extracted twice with ether, most of the ether removed by the use of a rotating evaporator, the remaining ether solution dried over $MgSO_4$, filtered, and distilled through a Holtzmann column to yield 1.73 g. of patchoulene (B.P. 114°/9.5 mm., 63% yield).

*Phosphorus trichloride dehydration*

E. A solution of 4.5 ml. of $PCl_3$ in 30 ml. of pyridine was placed in a flask and a cold solution of 3.0 g. of patchouli alcohol in 15 ml. of pyridine was added. The flask was then equipped with a reflux condenser and a drying tube and the solution refluxed for 30 min. The reaction mixture was cooled to room temperature and poured through a tube containing chopped ice. The resulting solution was extracted twice with ether, washed consecutively with dilute HCl, aqueous $Na_2CO_3$ and, finally, with water. The ether extract was dried over $MgSO_4$ and the ether removed by use of a rotating evaporator. Chromatography over 100 g. of Alcoa Alumina (Activity I) gave 2.05 g. of patchoulene which was eluted with petroleum ether (75% yield).

EXAMPLE II

To a stirred and cooled (4°) solution of 130 g. of a mixture of β- and γ-patchoulenes as hereinabove prepared (Ex. IA-IE) in 260 g. of benzene, was slowly added (20 min.) 20 g. of sodium acetate in 130 g. of peracetic acid, as marketed, e.g., by Becco Chemical Division, Food Machinery and Chemical Corporation, Buffalo, N.Y., under the designation, Becco peracetic acid 40%. The temperature of the contents was kept around 5° during the aforesaid addition. While maintaining this temperature, the contents were stirred for an additional 5 hours. The contents were then poured slowly (1–2 min.) into 520 ml. of an aqueous sodium hydroxide solution (20% concentration), the contents being cooled to around 25°–30°. The reaction contents were maintained at this temperature for 5 minutes following the completion of the addition to the alkali.

The contents were then separated into 2 layers. The bottom layer was extracted with benzene and this extract was combined with the top layer, which was then evaporated. The crude reaction mixture was distilled in a 1½ foot helices packed column and the following cuts were obtained:

(1) B.P. 1.2 mm./up to 93°=11 g. $n_D$ 1.4995 $\alpha_D$ −17
(2) B.P. 1.2 mm./93°–6°=15 g. $n_D$ 1.5015 $\alpha_D$ −12
(3) B.P. 1.2 mm./96°–7°=30 g. $n_D$ 1.5030 $\alpha_D$ −12
(4) B.P. 1.2 mm./97°–102°=16 g. $n_D$ 1.5055 $\alpha_D$ −24
(5) Residue=65 g.

Cut 1 consists mainly of unreacted alkenes as shown by the presence of a 12.7 micron band in the infrared spectrum.

Cut 2 is rich in β-epoxy patchoulane mixed with unreacted patchoulenes.

Cut 3 consists mainly of β-epoxy-patchoulane as shown by the maximum peaks at 10.35 and 12.1 microns, mixed with some γ-epoxy-patchoulane.

Cut 4 is rich in γ-epoxy-patchoulane and has maximum peaks at 10.45 and 12 microns, mixed with some β-isomer.

Cuts 2, 3 and 4 were practically free from carbonyl derivatives (patchoulione or patchouly aldehyde).

EXAMPLE III

*Perbenzoic acid oxidation of patchoulene*

Patchoulene (5.6 g.) dissolved in 100 ml. chloroform was placed in a three neck flask equipped with a mechanical stirrer, drying tube, and a dropping funnel. The flask was cooled in an ice bath. Perbenzoic acid (56.5 ml. of 88.2 g./l. solution) was added through the dropping funnel over a span of 20 minutes with stirring. The ice bath was removed after the addition of perbenzoic acid was complete and the reaction mixture was kept at room temperature (34° C.) for one hour. The reaction was worked up by washing with $Na_2CO_3$ solution with water followed by drying over $Na_2CO_3$. The solvent was removed with a rotating evaporator. Patchoulione (0.8 g.) was isolated from the residue by chromatography.

EXAMPLE IV

Cuts 2, 3 and 4 as prepared in accordance with Example II were combined and 14 g. of the resulting mixture was placed in 100 ml. of benzene, cooled in an ice bath to 10° and 1 ml. of boron trifluoride-etherate was added. The reaction mixture turns to a brilliant dark red immediately. The isomerization was run for 13 minutes and then extracted with two portions of sodium carbonate solution and washed with two portions of water. The organic phase was dried over $MgSO_4$ and concentrated. Distillation through a spinning band column gave 5.1 g. of faintly yellow patchoulione which solidified in the refrigerator. It was recrystallized from petroleum ether at $-70°$. Pure patchoulione, obtained by chromatography and repeated recrystallization, is a white solid, M.P. 48.5–50.0°, $[a]^{25}D = -64.2°$.

*Analysis.*—Calcd. for $C_{15}H_{24}O$: C, 81.76; H, 10.98. Found: C, 81.34, 81.44; H, 10.85, 10.91.

EXAMPLE V

*Patchoulione by chromium trioxide oxidation of patchoulene*

2.0 g. of patchoulene in 21 ml. of acetic acid was put into an Erlenmeyer flask and stirred with a magnetic bar. A solution of 2.6 g. of chromium trioxide in 13.2 ml. of 85% acetic acid was added over a period of one hour at 20°. The mixture was stirred at room temperature (ca. 30°) for 60 hours. Most of the acetic acid was removed under vacuo keeping the temperature below 40°. The residue was taken up in 100 ml. of water and extracted with 100 ml. of ether. The aqueous phase was extracted twice more with 100 ml. portions of ether. The combined ether extracts were washed with 5% $NaHCO_3$ solution until all acidic material was removed, rinsed with water and dried over $MgSO_4$. Removal of ether left 1.72 g. of pale yellow viscous oil.

The oil was chromatographed on alumina (35 g.). The fraction (0.43 g.) eluted with 1 part benzene-2 parts petroleum ether mixture was rechromatographed over alumina. 5% benzene-95% petroleum ether eluted 0.12 g. of patchoulione (5% yield).

The foregoing illustrates the practice of this invention which, however, is not to be limited thereby but is to be construed as broadly as permissible in view of the prior art and limited solely by the appended claims.

What is claimed is:

1. The process for preparing patchoulione, which comprises reacting patchoulene and peracetic acid at a temperature within the range of from about 1° to about 4° C. until no more peracetic acid reacts, extracting the reaction products with alkali, washing with water until neutral, and contacting under cooling the formed epoxy patchoulane with boron trifluoride.

2. A liquid comprising a major portion $\beta$-epoxy patchoulane and a minor portion of unreacted patchoulenes, boiling at 93°–96° C. under a pressure of 1.2 mm. of mercury, having an index of refraction of 1.5015 and optical rotation of $-12°$.

3. A liquid comprising a major portion of $\beta$-epoxy patchoulane and a minor portion of $\gamma$-epoxy patchoulane, boiling at 96°–97° C., under a pressure of 1.2 mm. of mercury, having an index of refraction of 1.5030 and an optical rotation of $-12°$.

4. A liquid comprising a major portion of $\gamma$-epoxy patchoulane and a minor portion of $\beta$-epoxy patchoulane, boiling at 97°–102° C. under a pressure of 1.2 mm. of mercury, having an index of refraction of 1.5055 and an optical rotation of $-24°$.

References Cited in the file of this patent

UNITED STATES PATENTS

| | | |
|---|---|---|
| 2,600,654 | Jacobs | June 17, 1952 |
| 2,660,609 | Robeson | Nov. 24, 1953 |

OTHER REFERENCES

Buchi: J.A.C.S., vol. 78, Mar. 20, 1956, pp. 1262–1263.

Simonsen: The Terpenes, vol. III (1952), pp. 175–178.

Phillips: Peracetic Acid and Derivatives, Union Carbide Chemicals Co. (1957), p. 4.